(12) United States Patent
Tabuta et al.

(10) Patent No.: US 8,466,653 B2
(45) Date of Patent: Jun. 18, 2013

(54) BATTERY CHARGER

(75) Inventors: Makoto Tabuta, Chichibu-gun (JP);
Motonobu Fujii, Sayama (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 281 days.

(21) Appl. No.: 13/128,980

(22) PCT Filed: Dec. 21, 2009

(86) PCT No.: PCT/JP2009/007074
§ 371 (c)(1),
(2), (4) Date: May 12, 2011

(87) PCT Pub. No.: WO2010/073593
PCT Pub. Date: Jul. 1, 2010

(65) Prior Publication Data
US 2011/0215754 A1 Sep. 8, 2011

(30) Foreign Application Priority Data

Dec. 22, 2008 (JP) ................................ 2008-325394

(51) Int. Cl.
*H02J 7/00* (2006.01)
*H02M 3/15* (2006.01)
*H02M 7/44* (2006.01)

(52) U.S. Cl.
USPC ........... 320/107; 320/110; 320/119; 320/123; 320/129; 323/282; 323/284; 363/125

(58) Field of Classification Search
USPC ........................................................ 320/107
See application file for complete search history.

(56) References Cited

U.S. PATENT DOCUMENTS 5,701,068 A * 12/1997 Baer et al. ..................... 320/119
6,081,084 A 6/2000 Crecelius
(Continued)

FOREIGN PATENT DOCUMENTS

EP 0 740 395 A2 10/1996
EP 0 740 395 B1 12/2001
(Continued)

OTHER PUBLICATIONS

Extended European Search Report in EP 09 83 4404 dated Jun. 18, 2012.

(Continued)

*Primary Examiner* — Yalkew Fantu
(74) *Attorney, Agent, or Firm* — Nixon & Vanderhye P.C.

(57) ABSTRACT

In a battery charger, the rectifier includes rectifying elements provided for respective three phases. The rectifier supplies, for the respective phases, currents for rectifying three-phase AC voltages so as to charge a battery. A voltage detector detects whether or not the battery is charged. Switching units are provided for the respective rectifying elements, and rectify the AC voltages to charge the battery in the off-state. Switch controllers output gate signals in accordance with a timing of zero-cross detection upon receiving a detection signal indicating that all the gate signals for turning on and off the respective switching units for the respective phases are supplied in the order of the phases. On the other hand, upon receiving a detection signal indicating that all the gate signals for the respective phases are not supplied in the order of the phases, the switch controllers output gate signals to the corresponding switching units in synchronization with the detection signal so as to enter the shorting state.

5 Claims, 5 Drawing Sheets

U.S. PATENT DOCUMENTS

| | | | |
|---|---|---|---|
| 6,934,166 B2* | 8/2005 | Vinciarelli | 363/17 |
| 7,019,506 B2* | 3/2006 | Kernahan | 323/284 |
| 7,365,514 B2* | 4/2008 | Tong | 320/110 |
| 2002/0030467 A1* | 3/2002 | Small | 320/107 |
| 2005/0017681 A1* | 1/2005 | Ogishima et al. | 320/112 |
| 2009/0027011 A1* | 1/2009 | Umetsu | 320/145 |

FOREIGN PATENT DOCUMENTS

| | | |
|---|---|---|
| JP | 11-225446 | 8/1999 |
| JP | 2005-198426 | 7/2005 |
| JP | 2005-328636 | 11/2005 |
| JP | 2006-30149 | 2/2006 |
| JP | 2007-329980 | 12/2007 |

OTHER PUBLICATIONS

Office Action and English translation in JP 2010-543842 dated May 8, 2012.

International Search Report for PCT/JP2009/007074, mailed Mar. 9, 2010.

* cited by examiner

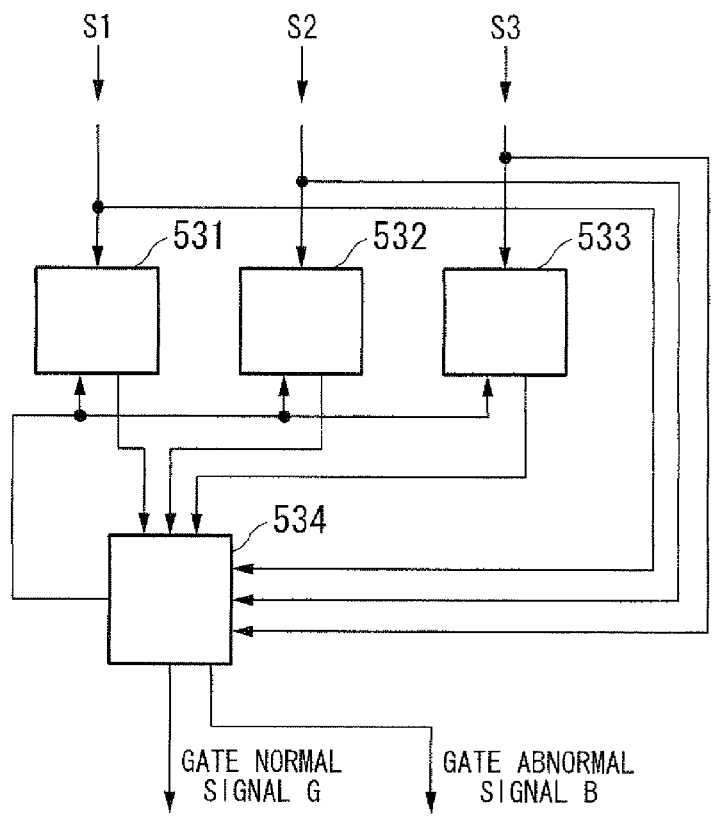

BATTERY CHARGER

TECHNICAL FIELD

The present invention relates to a three-phase noiseless short battery charger including a permanent-magnet three-phase alternating-current power generator.

This application is the U.S. national phase of International Application No. PCT/JP2009/007074, filed on Dec. 21, 2009, and claims priority on Japanese Patent Application No. 2008-325394, filed Dec. 22, 2008, the content of each of which are incorporated herein by reference.

BACKGROUND ART

As a battery charging system for motorcycles of related art, a short FET REG/REC including a permanent-magnet three-phase alternating-current power generator (ACG) is used (see, for example, Patent Document 1).

For example, regarding a battery charger shown in FIG. 4, diodes D1 to D3 rectify currents to charge a battery Batt when the battery Batt is charged. While the battery Batt is not charged, MOS transistors M1 to M3 are turned on, and the currents return to the three-phase alternating-current power generator ACG.

The MOS transistor M1 is connected in series to the diode D1. The MOS transistor M2 is connected in series to the diode D2. The MOS transistor M3 is connected in series to the diode D3. The MOS transistor M1 is turned on and off under control of the gate controller CONT1. The MOS transistor M2 is turned on and off under control of the gate controller CONT2. The MOS transistor M3 is turned on and off under control of the gate controller CONT3.

In other words, while the battery Batt is charged, as a result of zero-cross detection by comparators (CMP1, CMP2, and CMP3), the gate controllers perform synchronous rectification in which each of the gate controllers turns off the corresponding MOS transistor when an AC voltage is positive, and turns on the corresponding MOS transistor when the AC voltage is negative.

On the other hand, when the battery Batt becomes fully charged, the gate controllers turn on the corresponding FETs. Then, phases (U, V, and W) of the ACG are shorted through the respective FETs. Thus, the charging of the battery Batt is terminated, and the battery charger enters a non-charging state.

CITATION LIST

[Patent Document]
[Patent Document 1] Japanese Unexamined Patent Application, First Publication No. H11-225446

DISCLOSURE OF THE INVENTION

Problems to be Solved by the Invention

The three MOS transistors M1 to M3 (n-channel type) are provided for the respective three phases. Among the three phases, a phase to be connected to an MOS transistor in the on-state (shorting phase) differs in impedance from a phase to be connected to an MOS transistor in the off-state (charging phase). For this reason, as shown in FIG. 5A, a large current flows through only a path corresponding to the shorting phase (the U-phase shown in FIG. 5A), and a small current flows through paths corresponding to the charging phases (the V-phase and the W-phase shown in FIG. 5A). Thereby, current (exciting current) bias occurs among the three phases.

If this state continues, the current bias of the shorted U-phase causes the AC voltage to be biased toward the positive voltage region, and thereby to vibrate only in the positive voltage region.

Consequently, the zero-cross of the U-phase is not detected. Accordingly, the controller M1 corresponding to the U-phase cannot control the synchronous rectification for the U-phase.

In such a situation, the MOS transistor M1 corresponding to the U-phase in which a large current flows maintains the on-state. On the other hand, the MOS transistors M2 and M3 corresponding to the V and W phases in which only small currents flow are subjected to the on/off control by the synchronous rectification. In other words, charging of the battery Batt is performed by only the phases (V and W phases shown in FIG. 5B) in which only small currents flow, thereby causing a problem in that the battery B cannot be efficiently charged.

The present invention has been made in view of the above situations. An object of the present invention is to provide a battery charger that can release the exciting current bias which causes generation of bias excitation, control switching units that switch between charging and non-charging of a battery to operate reliably, and thereby efficiently charge the battery.

Means for Solving the Problems

A first aspect of the present invention is a battery charger that may include, but is not limited to: a rectifier that rectifies alternating-current voltages of three phases output from a power generator to charge a battery, the rectifier including a plurality of rectifying elements provided for the respective three phases; a voltage detector that detects that a voltage of the battery becomes equal to or greater than a predetermined voltage; a plurality of switching units provided for the respective rectifying elements, the plurality of switching units rectifying the alternating-current voltages to charge the battery in an off-state, and the plurality of switching units shorting outputs of the respective three phases of the power generator with a negative side of the battery in an on-state; a plurality of zero-cross detectors that detect zero-crosses of the alternating-current voltages for the respective three phases; a plurality of switch controllers provided for the respective three phases, the plurality of switch controllers outputting, based on results of the zero-cross detection for the respective three phases, gate signals for turning on and off corresponding ones of the plurality of switching units, and the plurality of switch controllers outputting gate signals for turning on the corresponding ones of the plurality of switch controllers when the voltage detector detects that the voltage of the battery becomes equal to or greater than the predetermined voltage; and a gate signal detector that detects whether or not all the gate signals for the respective three phases are output in the order of the respective three phases, and outputs a detection signal. The battery charger is characterized in that upon receiving, from the gate signal detector, the detection signal indicating that all the gate signals for the respective three phases are supplied in the order of the respective three phases, the plurality of switch controllers output gate signals in accordance with timings of the zero-cross detection. Upon receiving, from the gate signal detector, the detection signal indicating that all the gate signals for the respective three phases are not supplied in the order of the respective three phases, the plurality of switch controllers output the gate signals to the corresponding ones of the plurality of switching units in synchronization with the detection signal so as to short the outputs of the power generator with the negative side of the battery.

A second aspect of the present invention is the battery charger that is characterized in that when the gate signal detector supplies, to the plurality of switch controllers, the detection signal indicating that all the gate signals for the respective three phases are supplied in the order of the respective three phases, the plurality of switch controllers output the gate signals for turning on and off the corresponding ones of the plurality of switching units in synchronization with the timings of the zero-cross detection for the corresponding three phases.

A third aspect of the present invention is the battery charger that is characterized in that when the voltage detector detects that the voltage of the battery becomes equal to or greater than the predetermined voltage, the plurality of switch controllers output, after receiving the detection signal indicating that the gate signals are supplied in the order of the respective three phases, the gate signals for turning on the corresponding ones of the plurality of switching units in synchronization with the detection signal.

A fourth aspect of the present invention is the battery charger that is characterized in that upon receiving a detection signal indicating that a gate signal for any one of the three phases is not detected, the plurality of switch controllers output gate signals simultaneously to all the plurality of switching units even if the voltage detector detects that the voltage of the battery is smaller than the predetermined voltage.

A fifth aspect of the present invention is the battery charger that is characterized in that upon receiving a detection signal indicating that all the gate signals for all the three phases are not detected, the plurality of switch controllers continuously output, in synchronization with the detection signal, the gate signals for a period that is an integral multiple of a predetermined period of the three phases.

Effects of the Invention

According to the present invention, whether or not all the three phases are sequentially supplied in units of the three phases is detected. Based on a result of the detection, the charging state and the non-charging state of the battery are switched in units of the three phases. Thus, exciting current bias that causes generation of bias excitation is prevented. Accordingly, generation of bias excitation in the power generator is easily suppressed, thereby enabling efficient charging of the battery.

BRIEF DESCRIPTION OF THE DRAWINGS

FIG. 2A is a conceptual diagram illustrating a configuration and operation of a gate detector 52 of the present invention shown in FIG. 1.

FIG. 2B is a conceptual diagram illustrating the configuration and operation of the gate detector 52 of the present invention shown in FIG. 1.

BEST MODE FOR CARRYING OUT THE INVENTION

Figure 1:
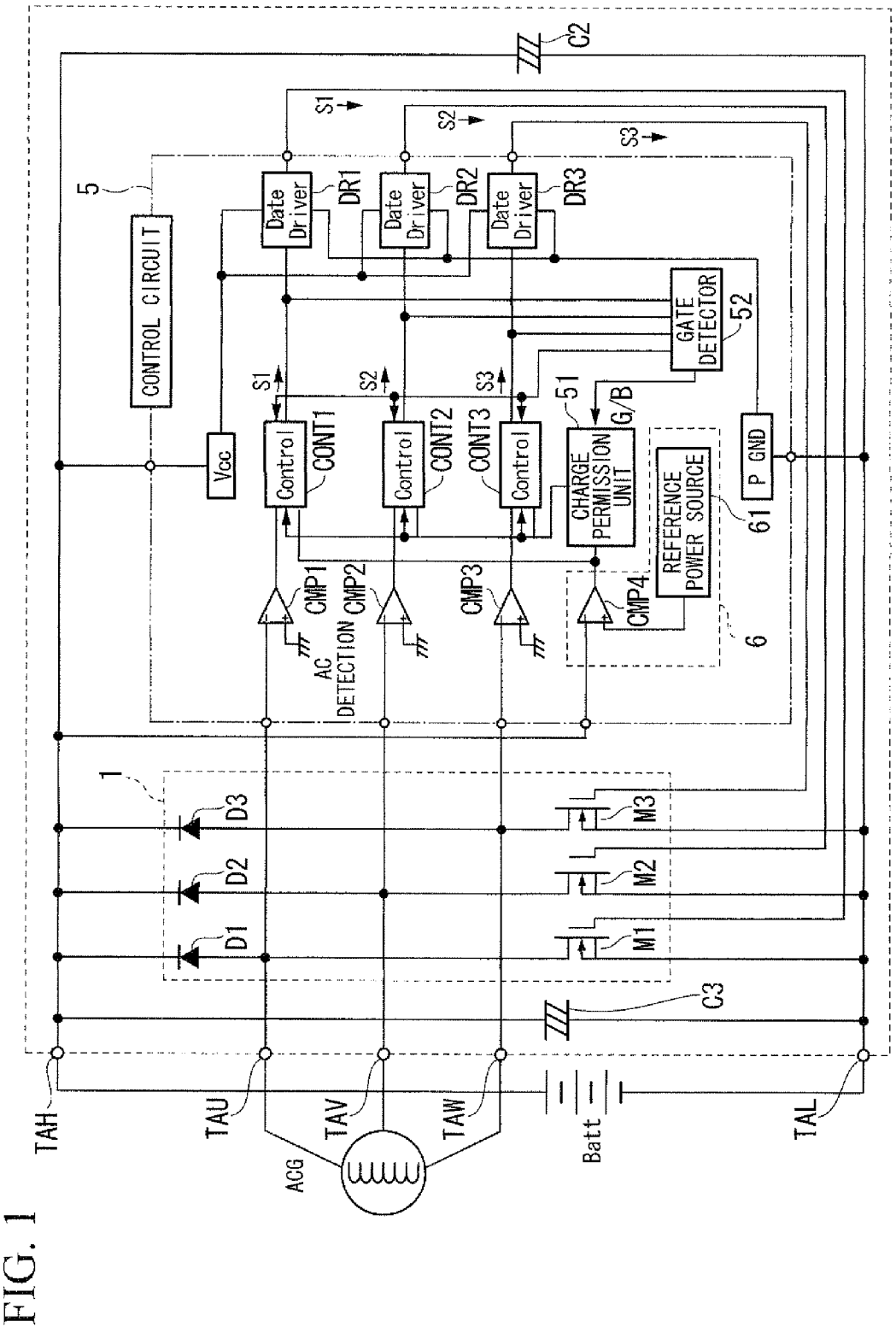
FIG. 1 is a block diagram illustrating an example of a configuration of a battery charger according to one embodiment of the present invention.

In the present invention, AC voltage bias among three phases of a U-phase, a V-phase, and a W-phase, which are received from a permanent-magnet three-phase alternating-current power generator (hereinafter, power generator) is detected based on whether or not AC voltages of the U, V, and W phases are supplied sequentially. When AC voltage bias among the three phases is detected, charging is suspended to release exciting current bias that causes generation of bias excitation, thereby enabling efficient charging of the battery.

For this reason, a battery charger of the present invention includes: a rectifier including rectifying elements provided for the respective three phases, the rectifying elements rectifying AC voltages of the three phases output from the power generator so as to charge a battery; a power detector (6) that detects that a voltage of the battery becomes equal to or greater than a predetermined voltage; switching units (M1, M2, and M3) provided for the respective rectifying elements, the switching units rectifying the AC voltages and thereby charging the battery in the off-state, and the switching units shorting outputs of the respective phases of the power generator with a negative side of the battery; zero-cross detecting circuits (CMP1, CMP2, and CMP3) that detect zero-crosses of the respective phases of the AC voltages; switch controllers (CONT1, CONT2, and CONT3) provided for the respective phases, the switch controllers outputting gate signals for turning on and off the corresponding switching units based on the results of the zero-cross detection of the respective phases, and the switch controllers outputting gate signals for turning on the switching units corresponding to the respective phases when the voltage detector detects that the voltage of the battery becomes equal to or greater than the predetermined voltage; and a gate signal detector (52) that detects whether or not all the gate signals are output sequentially for the respective phases, and outputs a detection signal.

When receiving, from the gate signal detector, a detection signal indicating that all the gate signals for the respective three phases are supplied sequentially in the order of the phases, the switch controllers output gate signals in accordance with the respective timings of the zero-cross detection. On the other hand, when receiving, from the gate signal detector, a detection signal indicating that all the gate signals for the respective three phases are not supplied sequentially in the order of the phases, the switch controllers output gate signals to the corresponding switching units in synchronization with the detection signal so as to short the outputs of the power generator with the negative side of the battery, and thereby suspends the charging process. The present invention is characterized in that when charging is required, it is determined, based on a result of determination by the switch controllers whether or not all the gate signals are supplied sequentially in the order of the phases, whether to continue the charging state or to temporarily enter the non-charging state so as to release exciting current bias among the three phases of U, V, and W phases which causes generation of bias excitation, and thereafter return to the charging state.

Hereinafter, the battery charger according to one embodiment of the present invention is explained with reference to the accompanying drawings. FIG. 1 is a block diagram illustrating an example of a configuration of the battery charger according to the embodiment.

As shown in FIG. 1, the battery charger includes a rectifier 1, a control circuit 5, and capacitors C2 and C3. The capacitors C2 and C3 are provided for releasing noises of a DC voltage, i.e., smoothing the DC voltage.

The rectifier 1 includes: diodes D1, D2, and D3; and n-channel MOS transistors M1, M2, and M3. The rectifier 1 rectifies the AC voltages of the U, V, and W phases output from a three-phase alternating-current power generator ACG to generate DC voltages and to charge a battery Batt.

Regarding the diodes D1, D2, and D3, cathodes thereof are connected to a terminal TAH that is connected to a positive terminal of the battery Batt.

Regarding the diode D1, an anode thereof is connected to a terminal TAU to which the AC voltage of the U-phase is supplied from the three-phase alternating-current power generator ACG.

Regarding the diode D2, an anode thereof is connected to a terminal TAV to which the AC voltage of the V-phase is supplied from the three-phase alternating-current power generator ACG.

Regarding the diode D3, an anode thereof is connected to a terminal TAW to which the AC voltage of the W-phase is supplied from the three-phase alternating-current power generator ACG.

Regarding the MOS transistor M1, a drain thereof is connected to the anode of the diode D1. A gate of the MOS transistor M1 is supplied with a control signal S1 from the control circuit 5. A source of the MOS transistor M1 is connected to a terminal TAL that is connected to the negative terminal of the battery Batt. When the MOS transistor M1 turns on, the MOS transistor M1 shorts the terminal TAU with the negative side of the battery Batt.

Regarding the MOS transistor M2, a drain thereof is connected to the anode of the diode D2. A gate of the MOS transistor M2 is supplied with a control signal S2 from the control circuit 5. A source of the MOS transistor M2 is connected to the terminal TAL that is connected to the negative terminal of the battery Batt. When the MOS transistor M2 turns on, the MOS transistor M2 shorts the terminal TAV with the negative side of the battery Batt.

Regarding the MOS transistor M3, a drain thereof is connected to the anode of the diode D3. A gate of the MOS transistor M3 is supplied with a control signal S3 from the control circuit 5. A source of the MOS transistor M3 is connected to the terminal TAL that is connected to the negative terminal of the battery Batt. When the MOS transistor M3 turns on, the MOS transistor M3 shorts the terminal TAW with the negative side of the battery Batt.

In the above configuration, when the control signal S1 is "H" level, the MOS transistor M1 turns on. Then, the terminal TAU for applying a voltage to the anode of the diode D1 becomes connected to the terminal. TAL. For this reason, the terminal TAU is shorted with the negative terminal of the battery Batt. Thus, the AC voltage of the U-phase supplied from the terminal TAU becomes a voltage of the negative terminal of the battery Batt. Consequently, the AC voltage of the U-phase is not output from the diode D1.

On the other hand, when the control signal S1 is "L" level, the MOS transistor M1 turns off Then, the terminal TAU for applying a voltage to the anode of the diode D1 becomes disconnected from the terminal TAL. For this reason, the terminal TAU enters the open state with respect to the negative terminal of the battery Batt. Consequently, the AC voltage of the U-phase is output from the diode D1.

Similarly, when the control signal S2 is "H" level, the MOS transistor M2 turns on. Then, the terminal TAV for applying a voltage to the anode of the diode D2 becomes connected to the terminal TAL. For this reason, the terminal TAV is shorted with the negative terminal of the battery Batt. Thus, the AC voltage of the V-phase supplied from the terminal TAV becomes a voltage of the negative terminal of the battery Batt. Consequently, the AC voltage of the V-phase is not output from the diode D2.

On the other hand, when the control signal S2 is "L" level, the MOS transistor M2 turns off. Then, the terminal TAV for applying a voltage to the anode of the diode D2 becomes disconnected from the terminal TAL. For this reason, the terminal TAV enters the open state with respect to the negative terminal of the battery Batt. Consequently, the AC voltage of the V-phase is output from the diode D2.

Additionally, when the control signal S3 is "H" level, the MOS transistor M3 turns on. Then, the terminal TAW for applying a voltage to the anode of the diode D3 becomes connected to the terminal TAL. For this reason, the terminal TAW is shorted with the negative terminal of the battery Batt. Thus, the AC voltage of the W-phase supplied from the terminal TAW becomes a voltage of the negative terminal of the battery Batt. Consequently, the AC voltage of the W-phase is not output from the diode D3.

On the other hand, when the control signal S3 is "L" level, the MOS transistor M3 turns off. Then, the terminal TAW for applying a voltage to the anode of the diode D3 becomes disconnected from the terminal TAW. For this reason, the terminal TAW enters the open state with respect to the negative terminal of the battery Batt. Consequently, the AC voltage of the W-phase is output from the diode D3.

As explained above, when the control signals S1, S2, and S3 are "L" level in accordance with the positive phases of the AC voltages of the U, V, and W phases, and when the control signals S1, S2, and S3 are "H" level in accordance with the negative phases of the AC voltages of the U, V, and W phases, the battery Batt is charged by at least one of the three phases corresponding to the respective control signals. When the control signals S1, S2, and S3 are "H" level irrespective of the positive or negative phases, the battery Batt is not charged.

The control circuit 5 includes: comparators CMP1, CMP2, and CMP3; gate controllers CONT1, CONT2, and CONT3; drivers DR1, DR2, and DR3; a charged voltage detector 6; a charge permission unit 51; and a gate detector 52.

The control circuit 5 suspends charging when the charged voltage of the battery Batt is equal to or greater than a predetermined threshold voltage. The control circuit 5 charges the battery Batt when the charged voltage of the battery Batt is smaller than the predetermined threshold voltage. Additionally, the control circuit 5 detects, from the three-phase AC voltage supplied from the power generator ACG, the presence or absence of exciting current bias that causes generation of bias excitation. Then, the control circuit 5 controls the rectifying unit 1 to release the exciting current bias.

The comparators CMP1, CMP2, and CMP3 are provided for detecting phases of the AC voltages of the U, V, and W phases supplied from the respective terminals TAU, TAV, and TAW, as will be explained later. Non-inverting input terminals (+) of the respective comparators CMP1, CMP3, and CMP3 are grounded.

An inverting input terminal (−) of the comparator CMP1 is connected to the terminal TAU, and is supplied with the AC voltage of the U-phase. An output terminal of the comparator CMP1 is connected to the gate controller CONT1. The comparator CMP1 compares the ground voltage to the AC voltage of the U-phase. When the AC voltage of the U-phase is smaller than the ground voltage, the comparator CMP1 outputs an "H" level signal from the output terminal thereof. When the AC voltage of the U-phase is higher than the ground voltage, the comparator CMP1 outputs an "L" level signal from the output terminal thereof. Thus, the comparator CMP1 detects a negative phase corresponding to when a voltage value of the U-phase is negative.

Similarly, an inverting input terminal (−) of the comparator CMP2 is connected to the terminal TAV, and is supplied with the AC voltage of the V-phase. An output terminal of the comparator CMP2 is connected to the gate controller CONT2. The comparator CMP2 compares the ground voltage to the AC voltage of the V-phase. When the AC voltage of the V-phase is smaller than the ground voltage, the comparator CMP2 outputs an "H" level signal from the output terminal thereof. When the AC voltage of the V-phase is higher than the ground voltage, the comparator CMP2 outputs an "L" level signal from the output terminal thereof. Thus, the comparator CMP2 detects a negative phase corresponding to when a voltage value of the V-phase is negative.

Additionally, an inverting input terminal (−) of the comparator CMP3 is connected to the terminal TAW, and is supplied with the AC voltage of the W-phase. An output terminal of the comparator CMP3 is connected to the gate controller CONT3. The comparator CMP3 compares the ground voltage to the AC voltage of the W-phase. When the AC voltage of the W-phase is smaller than the ground voltage, the comparator CMP3 outputs an "H" level signal from the output terminal thereof. When the AC voltage of the W-phase is higher than the ground voltage, the comparator CMP3 outputs an "L" level signal from the output terminal thereof. Thus, the comparator CMP3 detects a negative phase corresponding to when a voltage value of the W-phase is negative.

Hereinafter, explanations are given with an assumption that the "H" level signal output from the comparator CMP1 is a phase detection signal F1, the "H" level signal output from the comparator CMP2 is a phase detection signal F2, and the "H" level signal output from the comparator CMP3 is a phase detection signal F3.

The charged voltage detector 6 detects a value of the charged voltage of the battery Batt. The charged voltage detector 6 compares the charged voltage value and a predetermined threshold voltage value that indicates full charge. Then, when the charged voltage value is smaller than the threshold voltage value as a result of the comparison, the charged voltage detector 6 outputs an "H" level charging signal. When charged voltage value is equal to or greater than the threshold voltage value, the charged voltage detector 6 does not output an "H" level charging signal.

The charged voltage detector 6 includes: a comparator CMP4; and a reference power source 61 that supplies, to a non-inverting input terminal (+) of the comparator CMP4, a reference voltage value Vref as the threshold voltage for detecting whether or not the charged voltage value Ve indicates the full charge.

The reference power source 61 is a power source that outputs the reference voltage value Vref as the threshold value for determining whether or not the charged voltage value Ve indicates the full charge.

An inverting input terminal (−) of the comparator CMP4 is connected to the output terminal TAH, and is supplied with the charged voltage of the battery Batt.

Although not shown, the comparator CMP4 may voltage-divide the charged voltage of the battery Batt, and compare the divided charged voltage regarded as the voltage value Ve to the reference voltage value Vref.

The comparator CMP4 outputs an "H" level charging signal from the output terminal thereof when the following conditions are satisfied: the voltage value Ve is supplied to the inverting input terminal (−) of the comparator CMP4; the reference voltage Vref is supplied to the non-inverting input terminal (+); as a result of the comparator CMP4 comparing the voltage value Ve to the voltage value Vref, the voltage value Ve is smaller than the voltage value Vref; and the comparator CMP4 determines that it is not the full charge state and charging is necessary. On the other hand, when the voltage value Ve is equal to or greater than the voltage value Vref, the comparator CMP4 determines that it is the full charge state and it is necessary to terminate the charging, and outputs an "L" level charging signal, i.e., does not output the charging signal. Hereinafter, explanations is given with an assumption that the battery charger is in the charging state in which the charging signal is output when the signal output from the comparator CMP4 is "H" level, and that the battery charger is in the non-charging state in which the charging signal is not output when the signal output from the comparator CMP4 is "L" level.

The gate controller CONT1 outputs an "H" level signal (control signal S1) from the output terminal thereof when the charging signal is supplied from the charged voltage detector 6, the charge permission signal is supplied from the charge permission unit 51, and the phase detection signal F1 is supplied from the comparator CMP1 On the other hand, the gate controller CONT1 outputs an "L" level signal when the charging signal is supplied from the charged voltage detector 6, the charge permission signal is supplied from the charge permission unit 51, and the phase detection signal F1 is not supplied. The battery charger is in the charging state when the charging signal is supplied from the charged voltage detector 6, and the charge permission signal is supplied from the charge permission unit 51. When the charging signal is not supplied from the charged voltage detector 6, or when the charge permission signal is not supplied from the charge permission unit 51, the battery charger is in the non-charging state in which the gate controller CONT1 outputs the "H" level signal from the output terminal thereof irrespective of whether or not the phase detection signal F1 is supplied from the comparator CMP1.

Similarly, the gate controller CONT2 outputs an "H" level signal (control signal S2) from the output terminal thereof when the charging signal is supplied from the charged voltage detector 6, the charge permission signal is supplied from the charge permission unit 51, and the phase detection signal F2 is supplied from the comparator CMP2. On the other hand, the gate controller CONT2 outputs an "L" level signal when the charging signal is supplied from the charged voltage detector 6, the charge permission signal is supplied from the charge permission unit 51, and the phase detection signal F2 is not supplied. When the charging signal is supplied from the charged voltage detector 6 and when the charge permission signal is supplied from the charge permission unit 51, the battery charger is in the charging state. When the charging signal is not supplied from the charged voltage detector 6, or when the charge permission signal is not supplied from the charge permission unit 51, the battery charger is in the non-charging state in which the gate controller CONT2 outputs the "H" level signal from the output terminal thereof irrespective of whether or not the phase detection signal F2 is supplied from the comparator CMP2.

Additionally, the gate controller CONT3 outputs an "H" level signal (control signal S3) from the output terminal thereof when the charging signal is supplied from the charged voltage detector 6, the charge permission signal is supplied from the charge permission unit 51, and the phase detection signal F3 is supplied from the comparator CMP3. On the other hand, the gate controller CONT3 outputs an "L" level signal when the charging signal is supplied from the charged voltage detector 6, the charge permission signal is supplied from the charge permission unit 51, and the phase detection signal F3 is not supplied. The battery charger is in the charging state when the charging signal is supplied from the charged voltage detector 6, and the charge permission signal is supplied from the charge permission unit 51. When the charging signal is not supplied from the charged voltage detector 6, or when the charge permission signal is not supplied from the charge permission unit 51, the battery charger is in the non-charging state in which the gate controller CONT3 outputs the "H" level signal from the output terminal thereof irrespective of whether or not the phase detection signal F3 is supplied from the comparator CMP3.

As explained above, the gate controllers CONT1, CONT2, and CONT3 apply, in the charging state, positive biases to the gates of the respective MOS transistors M1, M2, and M3 when the AC voltages of the corresponding phases are negative. In this case, rectification currents flow through the MOS transistors M1 to M3, and thus synchronization rectification is performed. On the other hand, in the non-charging state, positive biases are simultaneously applied to the respective MOS transistors M1 to M3. Then, the respective phases of the three-phase alternating-current power generator ACG are shorted with the negative side of the battery Batt, thereby preventing overcharge.

It is assumed here that the "H" level signal output from the gate controller CONT1 is the control signal S1, the "H" level signal output from the gate controller CONT2 is the control signal S2, and the "H" level signal output from the gate controller CONT3 is the control signal S3.

The charge permission unit 51 outputs a charge permission signal when a gate normal signal G is supplied from the gate detector 52 while the charging signal is supplied from the charged voltage detector 6. On the other hand, when the gate normal signal G is supplied from the gate detector 52 while the charging signal is not supplied, the charge permission unit 51 suspends supplying the charge permission signal.

In other words, the charge permission unit 51 outputs the charge permission signal that is set to be "H" level when the gate normal signal G is supplied while the charging signal is supplied form the charged voltage detector 6. On the other hand, the charge permission unit 51 outputs the charge permission signal that is set to be "L" level when the gate normal signal G is supplied while the charging signal is not supplied.

Additionally, the charge permission unit 51 outputs the charge permission signal that is set to be "L" level when a gate abnormal signal B is supplied form the gate detector 52 while the charging signal is supplied from the charged voltage detector 6.

Thus, the gate controllers CONT1, CONT2, and CONT3 apply "L" level voltages to the respective MOS transistors M1 to M3 in accordance with the positive phases of the three-phase AC voltage. Meanwhile, the gate controllers CONT1, CONT2, and CONT3 apply "H" level voltages to the respective MOS transistors M1 to M3 in accordance with the negative phases of the three-phase AC voltage so as to charge the battery Batt.

As explained above, upon receiving a full-charge signal, the charge permission unit 51 does not output the charge permission signal to the gate controllers CONT1, CONT2, and CONT3.

Thus, the gate controllers CONT1, CONT2, and CONT3 apply "H" level voltages to the respective MOS transistors M1 to M3 irrespective of the negative phases of the three-phase AC voltage, so as to suspend charging of the battery Batt.

At this time, the gate detector 52 outputs the aforementioned gate normal signal G or the gate abnormal signal B in units of three phases of the respective U, V, and W phases, as will be explained later. For this reason, the control of switching between the charging state and the non-charging state is performed in a synchronized manner in units of the three phases of the U, V, and W phases, thereby preventing generation of exciting current bias among the three phases.

To detect exciting current bias among the U, V, and W phases in units of the three phases, the gate detector 52 determines whether or not the control signals S1, S2, and S3 are sequentially output from the gate controllers CONT1, CONT2, and CONT3, respectively. In other words, the gate detector 52 determines whether or not the control signals S1, S2, and S3 are supplied in the order of the U, V, and W phases without all the signals being missing.

For example, when the control signal S1 is output from the gate controller CONT1 in accordance with the supply of the U-phase, i.e., when charging starts from the U-phase, the gate detector 52 outputs the gate normal signal G upon detecting that the control signals are supplied in the order of S1→S2→S3. Similarly, when the control signal S3 is output from the gate controller CONT3 in accordance with the supply of the W-phase, i.e., when charging starts from the W-phase, the gate detector 52 outputs the gate abnormal signal B upon detecting that the control signals are supplied in the order of S3→S1→S2.

In other words, when the gate detector 52 detects in the charging state that the control signals are always circulated in the order of S1→S2→S3. If any one of the control signals S1, S2, and S3 is missing, and therefore the control signals S1, S2, and S3 are not output in this order, the gate detector 52 outputs the gate abnormal signal B to the gate controllers CONT1, CONT2, and CONT3, and suspends the charging while recognizing the state of the battery charger as the abnormal state.

Accordingly, the gate detector 52 outputs the gate abnormal signal B when the following conditions are met: the control signal S1 is first output from the gate controller CONT1 in accordance with the supply of the U-phase, i.e., the battery charger is in the charging state; as a result of the periodical detection of whether or not the control signals S1, S2, and S3 are output in this order when the charging starts from the U-phase, the first control signal is output twice while the second control signal is not supplied (i.e., one control signal is missing), such as in the case of S1→S2→S1 or S1→S3→S1.

As shown in FIG. 2A that is the block diagram illustrating an example of the configuration, the gate detector 52 includes: latches 531, 532, and 533; and a normality confirmation unit 534.

Upon receiving the control signal S1, the latch 531 outputs an "H" level latch signal as an output.

Upon receiving the control signal S2, the latch 532 outputs an "H" level latch signal as an output.

Upon receiving the control signal S3, the latch 533 outputs an "H" level latch signal as an output.

The normality confirmation unit 534 outputs a gate normal signal upon receiving all the three "H" level latch signals from the latches 531 to 533 in this order (i.e., the order of the U, V, and W phases), i.e., sequentially from the latch that first outputs the "H" level signal. On the other hand, the normality confirmation unit 534 outputs a gate abnormal signal upon receiving the "H" level signal twice from the latch having first outputted the "H" level signal without receiving an "H" level signal from any one of or both the two other latches. In other words, the abnormality confirmation unit 534 outputs the gate normal signal or the gate abnormal signal to the switch controllers CONT1, CONT2, and CONT3 based on whether or not all the "H" level signals are sequentially output from the three latches in the case of the circulation order of larch 531→latch 532→latch 533.

For example, the "H" level latch signal is first output from the latch 532. Then, the "H" level latch signal is output from the latch 533. Then, the "H" level latch signal is output again from the latch 532 while the "H" level latch signal is not output from the latch 531, i.e., when the "H" level latch signal from the latch 531 is missing. In this case, the gate detector 52 outputs the gate abnormal signal B.

In other words, the abnormality confirmation unit 534 operates according to the logic indicated by a table shown in FIG. 2B.

When the abnormality confirmation unit 534 detects whether or not latch signals are supplied sequentially from the latch 531 corresponding to the control signal S1, and when the latch signals are supplied in the order of S1→S2→S3, the abnormality confirmation unit 534 outputs a reset signal to the latches 531 to 533, and outputs the gate normal signal G to the charge permission unit 51. The abnormality confirmation unit 534 holds the gate normal signal until the next cycle of detecting whether or not the next set of latch signals are supplied sequentially, i.e., until the next latch signal is supplied.

On the other hand, the abnormality confirmation unit 534 outputs the reset signal and the pulse gate abnormal signal B to the latches 531 to 533 when latch signals are supplied sequentially from the latch 531 corresponding to the control signal S1, in the order of S1→S2→S1, S1→S3→S1, or S1→S1, i.e., a latch signal corresponding to the first supplied control signal is supplied twice while any one of or both the other latch signals supposed to be supplied thereafter are missing.

As shown in the table of FIG. 2B, the normality confirmation unit 532 detects abnormality of the gate also when the control signal to be supplied first is the control signal S2 or S3, and the control signals are not supplied in the order of U, V, and W phases, i.e., when the control signal corresponding to the first supplied phase is supplied twice while the control signals corresponding to any one of or both the following other phases are not supplied.

Upon receiving the gate abnormal signal B when the gate abnormal signals B are supplied to all the gate controllers CONT1, CONT2, and CONT3, the gate controllers CONT1, CONT2, and CONT3 forcibly output the control signals (S1, S2, and S3) at a predetermined time interval, for example, at a time interval equal to the integral multiple of the period of the three phases, even if the charging signal and the charge permission signal are not supplied from the charge voltage detector 6 and the charge permission unit 51, respectively, and even if the corresponding phase detection signals are not supplied.

Thanks to this process, even if zero-cross is not detected for some reason, exciting current bias, which causes bias excitation among the three phases of the AC voltage from the three-phase alternating-current power generator ACG, can be reset once. Thus, after voltage values among the three phases are equalized, the synchronized charge control in units of the three phases can be resumed.

Referring back to FIG. 1, the drivers DR1, DR2, and DR3 output the control signals S1, S2, and S3 to the MOS transistors M1, M2, and M3, respectively.

Figure 3A:
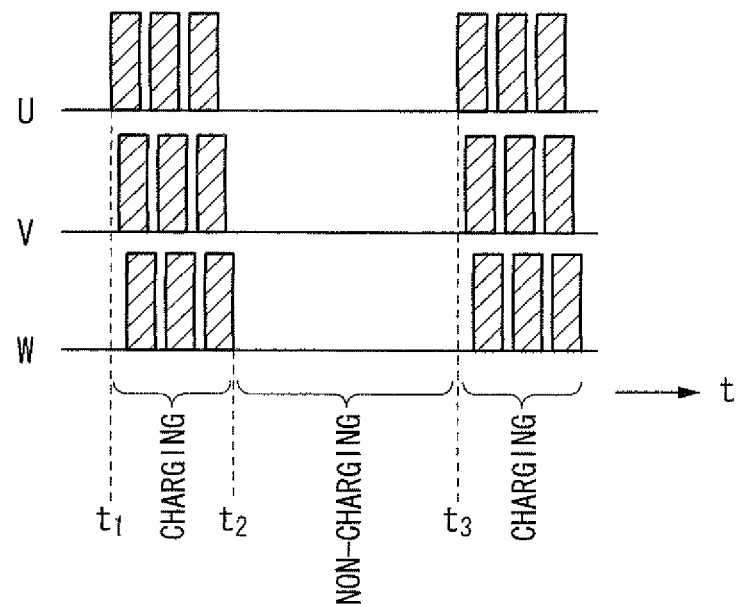
FIG. 3A is a waveform diagram illustrating an example of operation of the battery charger according to the present embodiment.

Hereinafter, operation of the battery charger of the present embodiment is explained with reference to FIGS. 1 and 3A. FIG. 3A is a waveform diagram illustrating an example of the operation of the present embodiment.

The charged voltage detector 6 detects that the charged voltage value Ve is smaller than the predetermined reference voltage value Vref, and is in the state in which the charged voltage detector 6 has output the charging signal.

Then, the charge permission unit 51 is outputting the "H" level charge permission signals to the gate controllers CONT1, CONT2, and CONT3.

Thereby, the gate controllers CONT1 to CONT3 output respective control signals if phase detection signals are supplied, and do not output the control signals if the phase detection signals are not supplied.

Consequently, the MOS transistors M1 to M3 are in the off-state while the corresponding phases are positive. On the other hand, the MOS transistors M1 to M3 are in the on-state while the corresponding phases are negative. For this reason, the terminals TAU, TAV, and TAW enter the charging state in which the AC voltages of the three phases of the U, V, and W phases are rectified, so as to perform the charging process.

Then, when the charged voltage value of the battery Batt exceeds the predetermined reference voltage value Vref at the time t2, the charged voltage detector 6 suspends the output of the charging signal.

Upon receiving the gate normal signal from the gate detector 52 in the state in which the supply of the charging signal is suspended, the charge permission unit 51 suspends the output of the charge permission signal.

Thereby, the gate controllers CONT1 to CONT3 output the respective control signals (S1, S2, and S3) irrespective of the supply of the phase detection signals (F1, F2, and F3), i.e., the phases of the three-phase AC voltage.

Consequently, the MOS transistors M1 to M3 are always in the on-state, the terminals TAU, TAV, and TAW are grounded, the charging process suspends, and thus the battery charger enters the non-charging state.

Then, when the charged voltage value of the battery Batt becomes smaller than the predetermined reference voltage value Vref at the time t3, the charged voltage detector 6 outputs the charging signal.

Upon receiving the charging signal, the charge permission unit 51 outputs the "H" level charge permission signals to the respective gate controllers CONT1 to CONT3.

Thereby, the gate controllers CONT1 to CONT3 output the respective control signals (S1, S2, and S3) in the phase in which the phase detection signal is supplied. The gate CONT1 to CONT3 do not output the respective control signals (S1, 52, and S3) in the phase in which the phase detection signal is not supplied.

Consequently, the MOS transistors M1 to M3 enter the off-state, the terminals TAU, TAV, and TAW are not grounded, and thus the battery charger enters the charging state in which the charging process is performed.

Figure 3B:
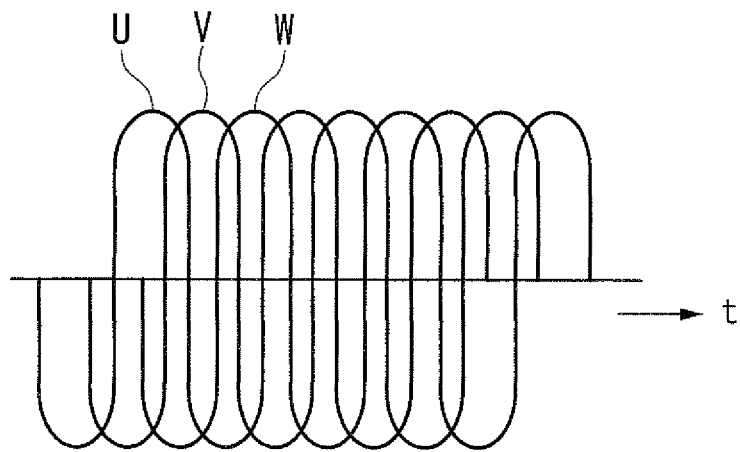
FIG. 3B is a waveform diagram illustrating an example of operation of the battery charger according to the present embodiment.
Figure 4:
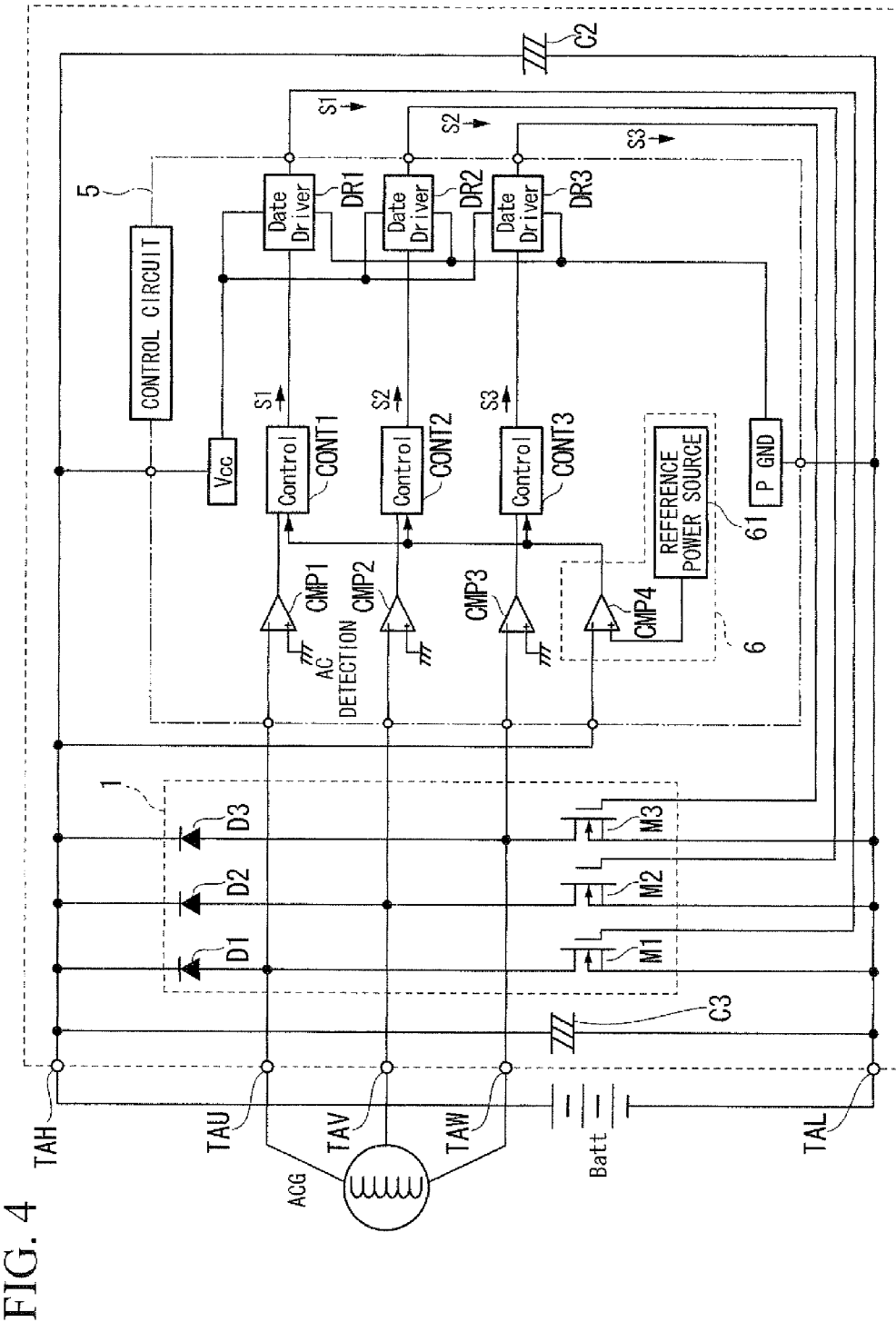
FIG. 4 is a block diagram illustrating a configuration of a battery charger of related art.
Figure 5A:
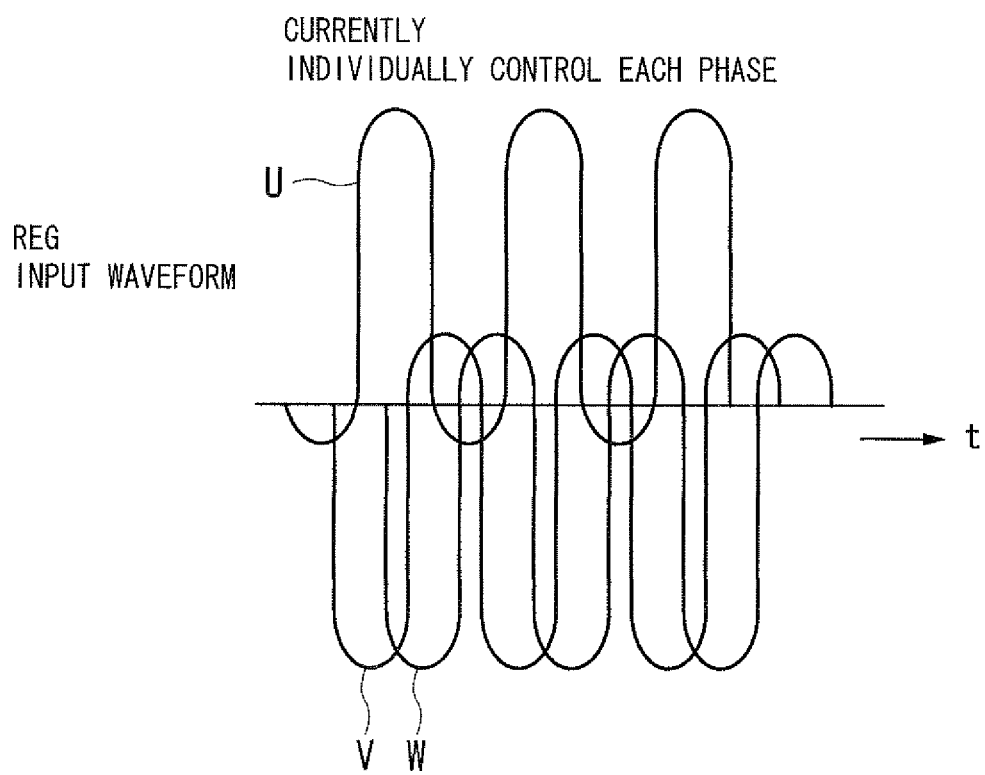
FIG. 5A is a waveform diagram illustrating an example of operation of the battery charger of the related art.
Figure 5B:
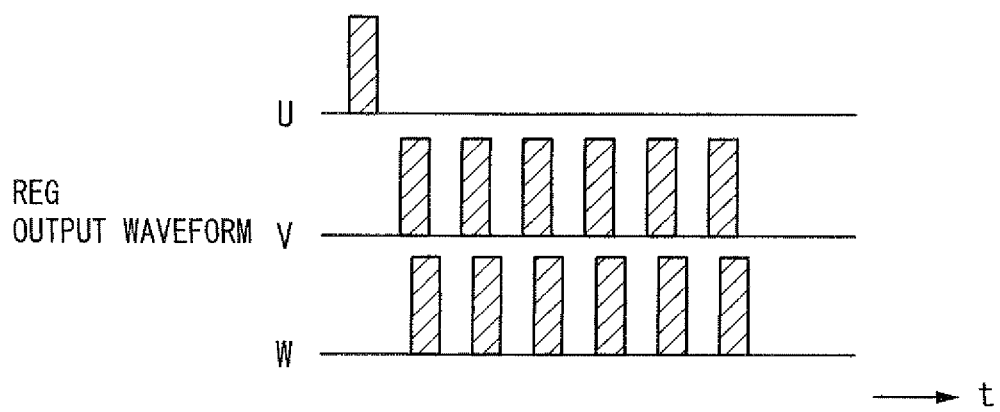
FIG. 5B is a waveform diagram illustrating an example of operation of the battery charger of the related art.

By means of the aforementioned processes, according to the present embodiment, the charging process and the non-charging process are performed while three phases of the U, V, and W phases are always paired and synchronized with one another. Accordingly, generation of exciting current bias among the three phases of the U, V, and W phases output from the three-phase alternating-current power generator ACG, which causes generation of bias excitation, can be prevented, as shown in FIG. 3B that is waveform diagram of the three-phase AC voltages.

Although one embodiment of the present invention has been explained in detail with reference to the accompanying drawings, the specific configuration is not limited thereto. Various modifications may be made without departing from the scope of the present invention.

DESCRIPTION OF REFERENCE NUMERALS

1: rectifier
5: control circuit
6: charged voltage detector
51: charge permission unit
52: gate detector
ACG: three-phase alternating-current power generator
Batt: battery
C2 and C3: capacitor
CMP1, CMP2, CMP3, and CMP4: comparator
D1, D2, and D3: diode
DR1, DR2, and DR3: driver
M1, M2, and M3: MOS transistor
TAU, TAV, TAW, TAH, and TAL: terminal

The invention claimed is:

1. A battery charger comprising:
a rectifier that rectifies alternating-current voltages of three phases output from a power generator to charge a battery, the rectifier including a plurality of rectifying elements provided for the respective three phases;
a voltage detector that detects that a voltage of the battery becomes equal to or greater than a predetermined voltage;
a plurality of switching units provided for the respective rectifying elements, the plurality of switching units rectifying the alternating-current voltages to charge the battery in an off-state, and the plurality of switching units shorting outputs of the respective three phases of the power generator with a negative side of the battery in an on-state;
a plurality of zero-cross detectors that detect zero-crosses of the alternating-current voltages for the respective three phases;
a plurality of switch controllers provided for the respective three phases, the plurality of switch controllers outputting, based on results of the zero-cross detection for the respective three phases, gate signals for turning on and off corresponding ones of the plurality of switching units, and the plurality of switch controllers outputting gate signals for turning on the corresponding ones of the plurality of switch controllers when the voltage detector detects that the voltage of the battery becomes equal to or greater than the predetermined voltage; and
a gate signal detector that detects whether or not all the gate signals for the respective three phases are output in the order of the respective three phases, and outputs a detection signal,
wherein upon receiving, from the gate signal detector, the detection signal indicating that all the gate signals for the respective three phases are supplied in the order of the respective three phases, the plurality of switch controllers output gate signals in accordance with timings of the zero-cross detection, and
upon receiving, from the gate signal detector, the detection signal indicating that all the gate signals for the respective three phases are not supplied in the order of the respective three phases, the plurality of switch controllers output the gate signals to the corresponding ones of the plurality of switching units in synchronization with the detection signal so as to short the outputs of the power generator with the negative side of the battery.

2. The battery charger according to claim 1, wherein when the gate signal detector supplies, to the plurality of switch controllers, the detection signal indicating that all the gate signals for the respective three phases are supplied in the order of the respective three phases, the plurality of switch controllers output the gate signals for turning on and off the corresponding ones of the plurality of switching units in synchronization with the timings of the zero-cross detection for the corresponding three phases.

3. The battery charger according to claim 1, wherein when the voltage detector detects that the voltage of the battery becomes equal to or greater than the predetermined voltage, the plurality of switch controllers output, after receiving the detection signal indicating that the gate signals are supplied in the order of the respective three phases, the gate signals for turning on the corresponding ones of the plurality of switching units in synchronization with the detection signal.

4. The battery charger according to claim 3, wherein upon receiving a detection signal indicating that all the gate signals for all the three phases are not detected, the plurality of switch controllers continuously output, in synchronization with the detection signal, the gate signals for a period that is an integral multiple of a predetermined period of the three phases.

5. The battery charger according to claim 1, wherein upon receiving a detection signal indicating that a gate signal for any one of the three phases is not detected, the plurality of switch controllers output gate signals simultaneously to all the plurality of switching units even if the voltage detector detects that the voltage of the battery is smaller than the predetermined voltage.

* * * * *